May 7, 1935.   F. GOLDBERGER   2,000,835
ARTIFICIAL SAUSAGE CASING
Filed March 22, 1932
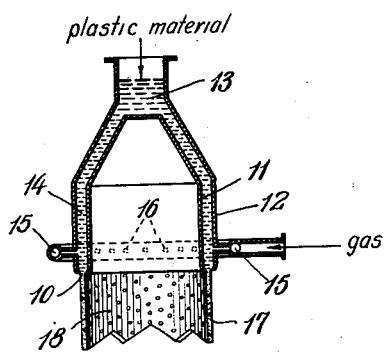
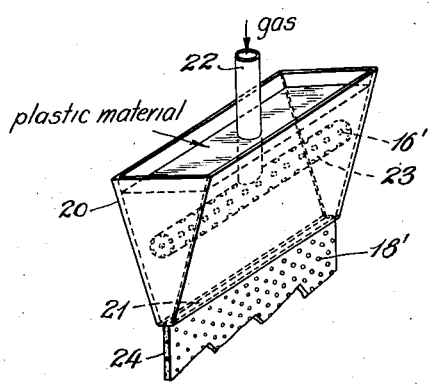
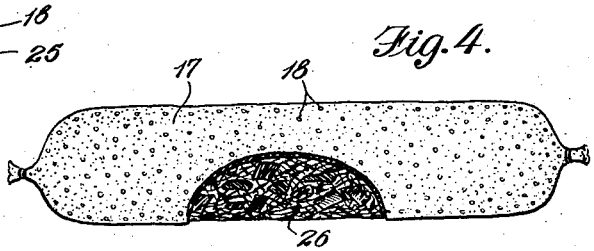
Franz Goldberger,
INVENTOR
Watson, Bristol, Johnson & Leavenworth
ATTORNEYS Patented May 7, 1935

2,000,835

UNITED STATES PATENT OFFICE 2,000,835

ARTIFICIAL SAUSAGE CASING

Franz Goldberger, Breda, Netherlands, assignor, by mesne assignments, to Sylvania Industrial Corporation, Fredericksburg, Va., a corporation of Virginia Application March 22, 1932, Serial No. 600,551
In Germany October 24, 1929

12 Claims.  (Cl. 17—45)

This invention has reference to artificial skins, envelopes and casings adapted for use in the packaging of sausages, head cheese, lard and other articles of the meat packing and similar industries and it is a general object of the invention to simplify the manufacture and to improve the quality of such goods and to make them substantially equivalent to the natural articles.

Artificial skins, envelopes and casings of the kind referred to are being manufactured in large quantities particularly from readily gelatinizable or solidifiable substances such, for example, as gelatine, cellulose, esters of cellulose and other cellulose compounds and the like by causing one of these substances such, for example, as viscose, to be forced from an annular nozzle into a precipitating bath or by causing a solution of nitrocellulose or an equivalent substance to dry up into a thin layer as a homogeneous film or foil. The seamless tubes or envelopes thus obtained are distinguished from the natural articles, among other objectionable features, by their low expansibility and by their limited permeability for gases and liquids as compared with the permeability and elasticity of natural skins. These distinguishing features are objectionable if the artificial articles are to be used as sausage casings and for similar purposes.

In the utilization of such artificial skins, envelopes and casings for packing so-called boiling sausages, saveloys and the like, the articles become flabby during the boiling on account of the excessive swelling of the film-like cellulose. In view thereof, the artificial skin fails properly to retain the sausage meat during the boiling operation, and a greasy liquor separates out from the meat. This liquor is prevented from escaping through the artificial skin in consequence of the deficient porosity thereof. These objectionable properties are not shown by natural skins and bladders which are both porous and elastic.

On the other hand, in the art referred to it is customary, in the manufacture of so-called Polish or Hungarian non-spoiling hard sausages, polonies and the like, to bring about evaporation of a part of the moisture contained in the meat within as short a period as possible. This result is accomplished in the case of natural skins or casings by the permeability thereof, while in the case of artificial skins, envelopes and casings consisting of cellulose, nitrocellulose and the like, this result is prevented by their impermeability or it is rendered so difficult that the usually required period of first storage must be considerably increased. The improper drying causes a great increase in the cost of manufacture of the sausage and tends to promote the fermentation and spoiling of the meat.

Now, these and other objectionable features in the manufacture of artificial skins, envelopes, casings and the like are eliminated by my invention due to the fact that in the manufacture of the artificial skins, envelopes and casings from cellulose or cellulose compounds and the like such, for example, as from cellulose nitrates, the material used for making the skins, envelopes and casings is provided with a multiplicity of finely distributed cavities. This object is accomplished by the mixing of the original solution with gas bubbles or with solid or liquid bodies which are removed from the material after its solidification. By this means, the permeability of the skins, envelopes and casings to moisture and vapors as well as gases and their elasticity and stretching qualities are increased. The proportionate elasticity and permeability may be governed and regulated within wide limits by suitably adjusting the size, the number and the distribution of the cavities. Thus, skins, envelopes and casings may, for instance be obtained which are made pervious by a large number of finely distributed small cavities of microscopic size and the dimensions of which may be increased at the discretion of the operator by correspondingly changing the working conditions. On the other hand, skins, envelopes and casings may be obtained in which the cavities may be observed by the naked eye and the material of which is permeable for liquids in any desired degree.

For a more complete understanding of the nature and objects of the invention, reference should be had to the following detailed description taken in connection with the accompanying drawing, in which:

Fig. 1 represents a suitable annular nozzle for producing a hollow casing forming one embodiment of the article of the invention;

Fig. 2 represents a suitable nozzle for producing a sheet adapted for forming a second embodiment of the article of the invention;

Fig. 3 represents an enlarged view in section of the wall of a casing of the invention; and Fig. 4 represents a view of one embodiment of the article of the invention.

As the raw materials for the improved sausage casings and the like, I may use non-fibrous, cellulosic material such, for example, as cellulose and any suitable derivatives thereof, such as cellulose nitrate, cellulose acetate, cellulose esters and the like or mixtures of such substances with each other or with other substances which may be converted into a soft, plastic or even semi-liquid or liquid condition for the incorporation of the cavities and which can be given the desired configuration. The utilization of these raw materials is generally effected in the form of solutions by using, for example, cellulose nitrate or other cellulose ester which is converted preferably into a highly viscous solution by the use of the well known solvents such, for example, as alcohol, ether or mixtures of solvents and nonsolvents. If required, the raw materials may acquire the desired degree of plasticity by other means such, for example, as by an increase of temperature and either without the use of any solvents at all or with a limited amount of solvents. Furthermore, softening agents may be added to the raw materials or to the solutions thereof before or during the treatment.

The production of the cavities in the skins, envelopes and casings by the use of gaseous liquid or solid auxiliary agents may be effected by different agents according to this invention. Thus, for example, gases such as air, nitrogen, carbonic acid, hydrogen, hydrogen sulphide at different degrees of distribution may be introduced into the soft mass or solution to be moulded or cast such, for example, as a highly viscous solution of nitrocellulose. This treatment may, for instance, be effected by forcing the gases into the soft mass or solution preliminary to passing the mass or solution through a flat or annular nozzle. Various mechanical mixing or distributing devices or thin nozzles may be employed to produce different degrees of distribution. In the case of an aqueous cellulose solution the gas bubbles may, for instance, be produced by electrolytic methods within the solution itself or in accordance with any suitable dispersing method or means.

The production of cavities in hollow tubular bodies adapted to be used as sausage casings may be accomplished by means of an apparatus such as that shown in Fig. 1 of the drawing. This apparatus comprises means for extruding the plastic mass or solution through an annular orifice 10 which is defined by the clearance between two concentric and coaxial members 11 and 12. The mass or solution is introduced through a conduit 13 and flows through the space 14 between the members 11 and 12. Adjacent the orifice there is provided, integral with the outer member 12, a ring 15 through which air may be passed into the space 14 through a plurality of fine apertures 16 which are provided in the wall of the member 12. The air is dispersed in the plastic mass or solution while the mass or solution is being extruded, thereby forming a hollow tubular body 17 containing a multiplicity of fine cavities 18.

For the production of cavities in flat sheet material which may be formed into skins, envelopes and casings, there may be employed an apparatus such as that shown in Fig. 2. This apparatus may comprise a hopper 20 into which the mass or solution is fed, the hopper being provided with a narrow slit 21. Air may be introduced into the mass or solution through a conduit 22 dipping into the mass or solution and a cylinder 23 provided with a plurality of fine apertures 16' and disposed parallel and just above the slit 21. The gas passing through these apertures is very finely dispersed in the mass or solution while it is extruded through the slit 21 in the form of a sheet 24 containing a multiplicity of fine cavities 18'.

As shown in the sectional view of Fig. 3, the articles of the invention are characterized by comprising a mass 25 of non-fibrous, cellulosic material having distributed therein a multiplicity of cavities 18. The cavities in the interior of the body are, of course, closed, while those on the surface are in the form of open craters. As shown in Fig. 3 the cavities and gas bubbles all have diameters which are less than the thickness of the wall of the skin envelope or casing so that no holes extend through the wall.

By the proper selection of the working conditions, for instance, as regards the treatment with the gases employed, the size and distribution of the gas bubbles introduced may be adapted to the degree of porosity desired in the finished products. The admission of the gases may also be effected during the moulding process by causing the gases to escape from suitably arranged small discharge openings and to enter into and to become incorporated in the plastic mass or solution during the extrusion of the mass or solution from an annular nozzle in the form of a seamless tubing. In the same manner the incorporation may be effected if the plastic mass or solution is discharged from a flat nozzle in the shape of a flat, thin sheet or foil from which, after solidification and finishing thereof, skins, envelopes and casings may be manufactured by uniting the edges, for instance, by an adhesive.

The gases to be incorporated with the artificial skins, envelopes and casings may be saturated with suitable vapors, particularly with vapors of solvents, or they may be partly saturated therewith, in order to prevent the local withdrawal of the solvents from the material adjacent the walls of the gas bubbles or in order to modify the optical properties of the finished products. The gases introduced into the mass may remain ordinarily in the cavities formed thereby. If it is desired to remove them, which in the course of time will take place anyhow by diffusion, the removal may be effected or accelerated by the use of suitable chemical, physical or mechanical means.

Suitable liquid or solid substances which are insoluble in the casing material may be distributed in the original solution before and during the moulding procedure at the desired degree of distribution and fineness by the same means which have been suggested for the incorporation of gases. The liquid or solid substances such, for example, as fats, oils, salts, silicates, which have been incorporated in the manner described may thereupon be separated from the finished skins, envelopes and casings in any suitable manner, as, for instance, by vaporization, by dissolving by means of suitable solvents as, for instance, by diffusion of lixiviation, by chemical decomposition or in any other suitable manner. With this treatment the cavities previously filled with the incorporating substances will thereby remain in the material of the skin, envelope or casing.

Skins, envelopes and casings consisting of partially saponified cellulose esters and, preferably, of partially denitrated cellulose nitrate have been found to be particularly adapted for use as sausage casings and to produce favorable results. As saponifying or splitting agents there may be employed a sulfohydrate or other reducing agent such as protochloride of iron, hydrazine or the like. In order to impart to skins, envelopes and casings from nitrocellulose or from other cellulose esters the property of non-inflammability or of rendering them difficultly inflammable, the original mass or solution may be mixed with chlorides, glycerine, epichlorhydrine, castor oil, boric acid and substances having a similar action.

In the denitration of the nitrocellulose, it is of advantage to carry out the denitrating operation only so far that the nitrogen content of the finished skin, envelope and casing will remain below about 2% and preferably below 1.5% and so that the percentage does not go down much below 0.5%. The skins, envelopes and casings thus obtained possess properties which render them particularly adapted for use as skins, envelopes or casings for sausages, meat products and the like, inasmuch as their swelling properties have been greatly reduced as compared with such articles formed of pure cellulose. Moreover, the strength of such a denitrated product remains considerably higher than in the case of skins, envelopes and casings of pure cellulose, even after they have been treated with hot water, while at the same time they fail to possess the stiffness and the high inflammability of the skins obtained from cellulose nitrate. Inasmuch as they possess, moreover, a higher degree of permeability for gases and vapors, they show properties which are very near those of the natural skins for which they constitute a substantially perfect substitute as sausage casings.

Skins, envelopes and casings formed of nitrocellulose having a nitrogen content of from about 0.5% to 2% by weight and the process for producing such articles are disclosed and claimed in my co-pending application, Serial No. 707,864, filed January 22, 1934.

For the utilization as sausage casings and the like, the skins, envelopes and casings obtained according to this invention present the additional advantage of a kind of cellular-structure and of a certain roughness of surface varying with the kind and distribution of the cavities, so that their similarity with the natural casings is increased as regards appearance and touch. The artificial article of the invention may be cut with the knife more easily and more neatly than the artificial skins and envelopes heretofore manufactured which possess, so to speak, a kind of smooth and homogeneous surface.

The artificial skins, envelopes and casings produced according to this invention may be employed as wrappers and containers for alimentary, pharmaceutical and other products such, for example, as casings or containers for cheese and other dairy and similar products. There is shown in Fig. 4 one embodiment of the article of the invention consisting of a sausage comprising a mass of meat 26 enclosed in a casing 17 which is provided with a multiplicity of fine cavities 18. The cavities render the casing semi-permeable so as to permit the proper diffusion and evaporation of water from the meat.

It will thus be seen that by means of the present invention there have been provided novel artificial skins, envelopes and casings adapted for encasing sausages and other alimentary products formed from non-fibrous, cellulosic material and having a multiplicity of cavities in the walls of the article and since certain modifications in the articles which embody the invention may be made without departing from its scope, it is intended that all matter contained in the above description shall be interpreted as illustrative and not in a limiting sense.

I claim:

1. As an article of manufacture, artificial skins, casings and envelopes, adapted for encasing sausages and other alimentary products, formed from non-fibrous cellulosic material and having a multiplicity of cavities in the walls of said article, whereby the permeability and elasticity of the walls are increased.

2. As an article of manufacture, artificial skins, casings and envelopes, adapted for encasing sausages and other alimentary products, formed from a soluble cellulose compound and having a multiplicity of cavities in the walls of said article, whereby the permeability and elasticity of the walls are increased.

3. As an article of manufacture, a sausage casing, formed from viscose and having a multiplicity of cavities in the walls of said casing whereby the permeability and elasticity of the walls are increased.

4. As an article of manufacture, a sausage casing, formed from a partially saponified cellulose ester and having a multiplicity of cavities in the walls of said casing, whereby the permeability and elasticity of the walls are increased.

5. As an article of manufacture, a sausage casing formed from a partially denitrated cellulose nitrate containing 0.5% to 2% by weight of nitrogen and having a multiplicity of cavities in the walls of said casing, whereby the permeability and elasticity of the walls are increased.

6. As an article of manufacture, a sausage casing, formed from a partially denitrated cellulose nitrate containing between 0.5% and 1.5% by weight of nitrogen and having a multiplicity of cavities in the walls of said casing, whereby the permeability and elasticity of the walls are increased.

7. As an article of manufacture, a sausage casing formed from non-fibrous cellulosic material, and having a multiplicity of gas bubbles in the walls of said article, whereby the permeability and elasticity of the walls are increased.

8. As an article of manufacture, a sausage casing formed from a soluble cellulose compound, and having a multiplicity of bubbles of gas in the walls of said casing, said gas bubbles containing a solvent of the cellulose compound whereby the permeability and elasticity of the walls are increased.

9. As an article of manufacture, a semi-permeable sausage casing formed from non-fibrous cellulosic material, and the walls of said casing having a cellular structure.

10. As an article of manufacture, a foodstuff consisting of an alimentary product contained within a casing formed from a non-fibrous cellulosic material and having a multiplicity of cavities in the walls of said casing.

11. As an article of manufacture, a foodstuff consisting of a sausage enclosed within a casing formed from non-fibrous material and having a multiplicity of cavities in the walls of said casing.

12. As an article of manufacture a sausage casing formed from a non-fibrous cellulosic material containing a softening agent and having a multiplicity of cavities in the walls of said casing, whereby the permeability and elasticity of the walls are increased.

FRANZ GOLDBERGER.